United States Patent
Wright et al.

(10) Patent No.: US 8,323,490 B1
(45) Date of Patent: Dec. 4, 2012

(54) PRESSURIZED WATER FILTRATION SYSTEM

(75) Inventors: William Scott Wright, Fort Collins, CO (US); Bradley J. Florin, Fort Collings, CO (US)

(73) Assignee: Instapure Brands, Inc., Loveland, CO (US)

( * ) Notice: Subject to any disclaimer, the term of this patent is extended or adjusted under 35 U.S.C. 154(b) by 0 days.

(21) Appl. No.: 13/565,322

(22) Filed: Aug. 2, 2012

(51) Int. Cl.
*B01D 35/027* (2006.01)

(52) U.S. Cl. .................. 210/232; 210/321.6; 210/416.3; 210/455; 210/469; 210/474; 210/482; 210/484; 222/189.11

(58) Field of Classification Search ........................ None
See application file for complete search history.

(56) References Cited

U.S. PATENT DOCUMENTS

| | | | |
|---|---|---|---|
| 63,090 A | 3/1867 | Phillips | |
| 663,271 A | 12/1900 | Hamilton | |
| 978,265 A | 12/1910 | Barnett | |
| 2,670,081 A * | 2/1954 | Quinn | 210/316 |
| 4,397,177 A | 8/1983 | Cain | |
| 4,477,347 A | 10/1984 | Sylva | |
| 5,120,437 A * | 6/1992 | Williams | 210/244 |
| 5,130,015 A * | 7/1992 | Simizu et al. | 210/136 |
| 5,733,448 A | 3/1998 | Kaura | |
| 5,914,045 A | 6/1999 | Palmer et al. | |
| 6,478,956 B2 | 11/2002 | Kaura | |
| 7,014,817 B1 | 3/2006 | Hand et al. | |
| 7,413,653 B2 * | 8/2008 | Powell | 210/416.3 |
| 7,438,807 B2 * | 10/2008 | Garner et al. | 210/202 |
| 8,147,685 B2 * | 4/2012 | Pritchard | 210/94 |
| 2003/0164333 A1 * | 9/2003 | Nohren et al. | 210/650 |
| 2006/0273000 A1 | 12/2006 | Chung | |
| 2009/0314703 A1 * | 12/2009 | Beach et al. | 210/232 |
| 2010/0187183 A1 * | 7/2010 | Nelson et al. | 210/741 |

FOREIGN PATENT DOCUMENTS

| | | |
|---|---|---|
| CN | 201008766 | 1/2008 |
| JP | 11051832 | 2/1999 |
| WO | 9213700 | 8/1992 |
| WO | 0057985 | 10/2000 |

OTHER PUBLICATIONS

Katadyn Product Hiker Pro Microfilter—Item #: 81917, CAMPMOR website, http://www.campmor.com/outdoor/gear/Product_81917?cm_vc=PDPZ1 accessed on Apr. 24, 2012.
Katadyn Vario Microfilter—Item #: 82400, CAMPMOR website, http://www.campmor.com/outdoor/gear/Product_82400?cm_vc=PDPZ1 accessed on Apr. 24, 2012.
MSR Miniworks EX Water Filter—Item #: 87779, CAMPMOR website, http://www.campmor.com/msr-miniworks-ex-water-filter.shtml?source=CI&ci_src=14110944&ci_sku=87779WC accessed on Apr. 24, 2012.

* cited by examiner

*Primary Examiner* — Joseph Drodge
(74) *Attorney, Agent, or Firm* — Nilay J. Choksi; Anton J. Hopen; Smith & Hopen, P.A.

(57) ABSTRACT

A piston pressurized water filter activated by the user or external source. The water filter assembly includes a hollow cylindrical water reservoir, a hollow cylindrical piston threaded into the top of the water reservoir, and a water filter threaded into the bottom of the water reservoir. The interior of the water reservoir is sealed by the piston and water filter. When the water reservoir is filled with unfiltered water, the piston can be threaded down into the water reservoir to create sufficient pressure on the unfiltered water and force the water into the water filter. The water filter can include any combination of carbon, ceramic or other filtering material in a block or disk form. Water is forced into the water filter, through the carbon or ceramic filter mass, and into a container that may or may not be coupled to the water filter.

30 Claims, 9 Drawing Sheets

PRESSURIZED WATER FILTRATION SYSTEM

BACKGROUND OF THE INVENTION

1. Field of the Invention

This invention relates, generally, to water filtration at the point-of-use for the reduction of undesirable contaminants and increase in the quality of taste and odor. More particularly, it relates to portable water filtration using a novel water filtration system with thread-forced pistons that allow the system or its user to easily generate water pressure capable of achieving high quality water filtration.

2. Description of the Prior Art

Municipal water is treated with chlorine or chloramine in order to kill bacteria and viruses. To address consumer concern over taste and odor, as well as potential health effects caused by the excessive consumption of chlorine, stationary point-of-use water filtration systems designed to reduce chlorine using granular activated carbon (GAC) and often certified against NSF/ANSI Standard 42, are well-known and have been effective in the art. Examples include tap water filters attached to the end of a water faucet, said filters filtering water on-demand; water filters that are installed in the water source line, said filters filtering all or part of the water flowing through the line; and refrigerator water filters that provide water filtration prior to the production of ice or delivery of water on-demand.

Municipal water treatment is an imperfect science. The levels of chlorine and chloramine may be inconsistent and are not always fully effective against microbial cysts, such as giardia and cryptosporidium. Even with treatment, some water supplies contain unsafe levels of lead from aging plumbing fixtures, as well as mercury and Volatile Organic Compounds (VOCs) introduced into the water supply through ground water leaching of industrial pollutants or agricultural chemicals. To address these concerns, manufacturers of household water filtration systems began to develop solid carbon block based filters with micro pores small enough to eliminate substantially all microbial cysts. Additionally different additives can be combined with the carbon block formula to allow for adsorption of undesirable contaminants such as lead, mercury and VOCs. These stationary systems connected to household plumbing benefit from the water pressure delivered by the municipal water systems, thereby producing the force required to push the water through the solid carbon block, achieving a reduction level of contaminants compliant with NSF/ANSI Standard 53.

Portable water filtration systems for use when hiking or camping are also well known and typically use a carbon, ceramic or combination filter with a hand pump or lever manually driven by the user to draw water from a source and/or create pressure through the filtration system, expelling filtered water from the filter media. These systems are designed to reduce bacteria, protozoa and viruses that are commonly found in untreated water sources. However, these systems suffer from slow flow of water, require a high degree of maintenance with regular cleaning of their ceramic filter, and demand a large work effort on the part of the user in relation to the amount of filtered water produced.

A relatively new innovation in portable water filtration systems is the use of a specially designed straw that incorporates one or more water filtration media, such as a hollow fiber membrane ("HFM"). Originally designed for third world countries where water quality is very low in order to facilitate reduction of bacteria and viruses, these filter straws are seeing more popularity as an alternative to cumbersome hiking and camping water filtration systems. However, filter straws are not conducive to filtering water for cooking, not usable for filtering water to be stored for later use (e.g., for use while away from a river, lake, or other water source), and are not designed for shared use due to cross-contamination concerns. Additionally, these straws do not address taste or odor, as HFM does not necessarily absorb particulates but simply stops the flow of particulates larger than its pore size.

Another relatively new innovation that is seeing widespread adoption is the incorporation of a portable water filter into plastic squeeze bottles. Because plastic squeeze bottles can generate only minimal pressure, granular activated carbon is the primary filtration media used since these devices produce insufficient pressure to drive water through a ceramic filter or solid carbon block, which are substantially denser. Thus, the highest rating this type of water filter bottle can receive is NSF/ANSI Standard 42. This degree of water filtration is not sufficient to address consumer concerns regarding other contaminants in their water that are embodied in NSF/ANSI Standard 53 such as lead, mercury, industrial pollutants and agricultural chemicals.

The prior art described herein only partially addresses a traveler's portable water filtration needs, forcing one to choose between a system designed for municipal water where chlorine, lead, industrial pollutants and agricultural chemicals are of primary concern under NSF/ANSI Standard 53 and a system designed for untreated (i.e., non-potable) water where the potential for bacteria, protozoa and viruses are of significant, if not primary, concern.

The prior art has not shown the application of a portable filtration device designed specifically to meet NSF/ANSI P231 Protocol. "Microbiological Water Purifiers Overview: Protocol P231", which is incorporated by reference herein, addresses systems that use chemical, mechanical, and/or physical technologies to filter and treat waters of unknown microbiological quality, but that are presumed to be potable. Filtration to this Protocol would meet the needs of travelers visiting countries where the municipal water supply is deemed to be "Potable" but may not meet or equal the quality to which they are accustomed or acclimated. To date, conventional compact, portable water filtration devices have been unable to meet the standards for this certification. The only systems that remain close to the standards are chlorinators that simply add chlorine to the water.

Prior art has attempted to address the apparent conundrum with little success. U.S. Pat. No. 978,265 granted December 1910, to Barnett describes a hand pump that pressurizes liquid through an outlet pipe via use of a hand-rotated, threadably-engaged piston applying a force onto the liquid. While useful for a method of providing pressure Barnett fails to address the use of the pressure for filtration purposes.

U.S. Pat. No. 4,397,177 granted August 1983, to Cain herein incorporated by reference, addresses a hydraulic filter press apparatus for filtering samples of drilling mud. Cain uses a piston threadably engaged to a pump body. As the piston rotates, engaging the threads therearound, the fluid within the pump body is pressurized into the lower portion or the apparatus. The lower portion of the apparatus contains a fine metal screen, a disc filter paper, and a liquid outlet. While Cain is a filter of sorts, it lacks in portability and functionality for use in water filtration. The primary focus of Cain is in obtaining mud samples free of water as opposed to water free of harmful contaminants.

Along the lines of Cain, several pressure filter patents exist that concern filtration of substances, but lack the necessities of drinkable water purification and portability. U.S. Pat. No. 63,090 to Phillips describes an improved press strainer, or fruit strainer, that uses a threaded screw that, when rotated and threaded into a cylinder, pressurizes and filters food items, such as fruit or butter. The cylinder is threaded along its lower portion as well to fit an output funnel. U.S. Pat. No. 7,014,817 to Hand, et al. describes a remote zero headspace extractor that places a sampling container within a stainless steel vessel. A manual piston is disposed within the vessel and underneath the sampling container. As the piston is threaded, pressure is exerted on the sampling container, which pushes the extract within the sampling container through a filter and into a tedlar bag or bottle. PCT Patent App. Pub. No. WO 1992013700A1 to Tsutsumi describes a hot runner mold apparatus that utilizes a screw plunger to pressurize and force a plasticized melt into a filter that removes any impurities in the metered melt. All of these patents lack the purpose, direction and capability of producing highly filtered drinking water.

Filters that use pressure to filter water lack the tools to be truly compact, simplistic in application and receive ratings of NSF/ANSI Standard 53. Chinese Patent App. No. CN201008766Y to Song describes an apparatus for treating water via a portable vacuum filter that is actuated by rotating a threadably-engaged piston. Japanese Patent App. No. JP11051832A to Yutaka, et al. describes an apparatus that uses a rotatable shaft coupled to a piston to apply pressure to a sample of soil, the water within which is siphoned through a filter into a container. U.S. Patent App. Pub. No. 2006/0273000 to Chung describes a "portable" water filtering device that uses a threaded piston to apply pressure onto water, forcing the water across a series of tubing and into a filtering tube. Sufficient pressure must be provided to force the water up the filtering tube and into the dispensing pipe. PCT Patent App. Pub. No. WO 2000057985A1 to Brebner, et al. describes a water filtration device including a filter member that is pressed into container via threaded piston rod. Initially, water is filled within container underneath filter member. Then the filter member is driven down through the volume of water, urging the water up through filter medium. The structure is a mesh screen that protects the water from airborne contaminants.

These various embodiments of pressurized filters span a period of over one-hundred years. They span from mining to organic, from water removal to water filtration. Yet throughout this evolution there lacks a compact, portable, easy to use, pressurized filtration device that achieves optimum filtration, via filters capable of achieving ratings of NSF/ANSI Standard 42, NSF/ANSI Standard 53, and NSF/ANSI Protocol P231.

Accordingly, what is needed is a portable water filter that can generate sufficient pressure to produce the desired or required quality of filtration. However, in view of the art considered as a whole at the time the present invention was made, it was not obvious to those of ordinary skill how the art could be advanced.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

SUMMARY OF THE INVENTION

The long-standing but heretofore unfulfilled need for an improved, higher quality, sufficiently pressured travel portable water filtration system that both drives water through a micro-pore filtration medium and maximizes adsorption (i.e., increase the amount of time the water is exposed to the filter medium, thereby allowing the filter medium to adsorb unwanted contaminants) is now met by a new, useful and nonobvious invention.

In an embodiment, the current invention is a portable water filtration assembly. The assembly includes a hollow cylindrical water reservoir with an open top and open bottom and a cylindrical piston at least partially disposed within the open top of the water reservoir. The bottom of the piston has sealing contact with the wall of the reservoir. The water reservoir has a plurality of threads disposed partially along its inner extent, and the piston has another plurality of threads disposed at least partially along its outer extent. Both pluralities of threads are adapted to engage each other. A water filter is disposed along the open bottom of the reservoir, so that when the threads are engaged, the piston pushes any unfiltered water down the reservoir and through the water filter.

In a separate embodiment, the current invention is a portable water filtration assembly. The assembly includes a hollow cylindrical water reservoir with open top and open bottom, a first cylindrical piston partially disposed within the open top of the water reservoir, a second cylindrical piston wholly disposed within the reservoir below the first piston, and a spring mechanism that couples the first and second pistons. A plurality of threads is disposed partially along the inner extent of the reservoir, and a plurality of threads is disposed at least partially along the outer extent of the first piston. Both pluralities of threads are adapted to engage each other. A water filter is disposed along the open bottom of the reservoir, so that when the threads are engaged, the first piston is driven downward, compressing the spring mechanism, which in turn drives the second piston downward, thereby pushing any unfiltered water down the reservoir and through the water filter. This embodiment of the current invention may include one or more of the structural and functional additions, described previously, for example direct drive motor, return spring, various filter masses and disks, etc.

In either embodiment, the water filter may include a circular filter frame disposed under the bottom edge of the reservoir, and a fluid port can be disposed in the center of the filter frame, so water can flow through the fluid port into the water filter. The water filter itself may be structured similar to conventional end-of-faucet or refrigerator filters.

In a further embodiment, the water filter may include a filter mass disposed in underlying relation to the filter frame. The filter mass is coupled to the fluid port via a filter enclosure that encloses the filter mass. The filter enclosure can include an additional fluid port on its bottom portion, so then water may flow through the filter mass and out the additional fluid port into a beverage container. In yet a further embodiment, the additional fluid port is structurally adapted to couple to the beverage container, for example by threading. In another embodiment, the filter mass may be formed of a material selected from carbon, ceramic, hollow fiber membrane, micro-porous plastic, or any combination thereof.

In a further embodiment, the water filter can include a filter disk within the filter frame and above the fluid port. Thus, the water can flow through the filter disk and exit the water filter through the fluid port of the beverage container. In yet a further embodiment, the fluid port is structurally adapted to couple the beverage container, for example by threading. In another embodiment, the filter disk may be formed of a material selected from carbon, ceramic, hollow fiber membrane, micro-porous plastic, or any combination thereof. This water filter itself may be similar to conventional end-of-faucet, refrigerator, or camping filters.

The piston may be substantially hollow and adapted to store supplementary items, such as additional water filters, filter masses, and/or filter disks.

The water filtration assembly may further include a covering disposed in overlying relation to the piston and structurally adapted to facilitate manipulation (e.g., twisting) of the piston.

The water filtration assembly may further include a piston jacket that encloses the piston and water reservoir, such jacket optionally designed for use as a cup for consumption of filtered water.

The water reservoir, piston, and both pluralities of threads can each be formed of a high quality plastic or other materials that can withstand the pressure subjected on the filtration assembly.

The water filtration assembly may further include a direct drive motor mechanically coupled to the assembly. The motor, when actuated, engages the pluralities of threads to drive the piston into the unfiltered water in order to pressurize it and push it through the water filter. A power source can also be included to power the motor.

The water filtration assembly may further include a cap structure disposed in outer and overlying relation to the piston. This creates an interstitial space between the top edge of the piston and the top edge of the cap structure. A return spring can be disposed within the interstitial space. A compressed air cartridge can be coupled to the interstitial space via a hollow tubing, so that compressed air can be released from the cartridge, flow through the tubing and into the interstitial space, thereby expanding the return spring and forcing the piston downward by threading. A pressure release valve may also be disposed in sealable flow communication with the interstitial space to release excess pressure/compressed air.

The water filtration assembly may again further include a cap structure disposed in outer and overlying relation to the piston. This creates an interstitial space between the top edge of the piston and the top edge of the cap structure. A return spring can be disposed within the interstitial space. A pressure relief valve is disposed in sealable flow communication with the interstitial space and is adapted to receive a line pressure source. The line pressure source provides a fluid (e.g., gas or liquid) that can flow into the interstitial space. This flow increases pressure, thereby expanding the return spring and forcing the piston downward by threading.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the nature and objects of the invention, reference should be made to the following detailed disclosure, taken in connection with the accompanying drawings, in which:

FIG. 5a depicts a top view of a storage capsule used in a portable water filtration assembly, said capsule containing a plurality of filter masses of FIG. 4a;

DETAILED DESCRIPTION OF THE PREFERRED EMBODIMENT

Figure 1:
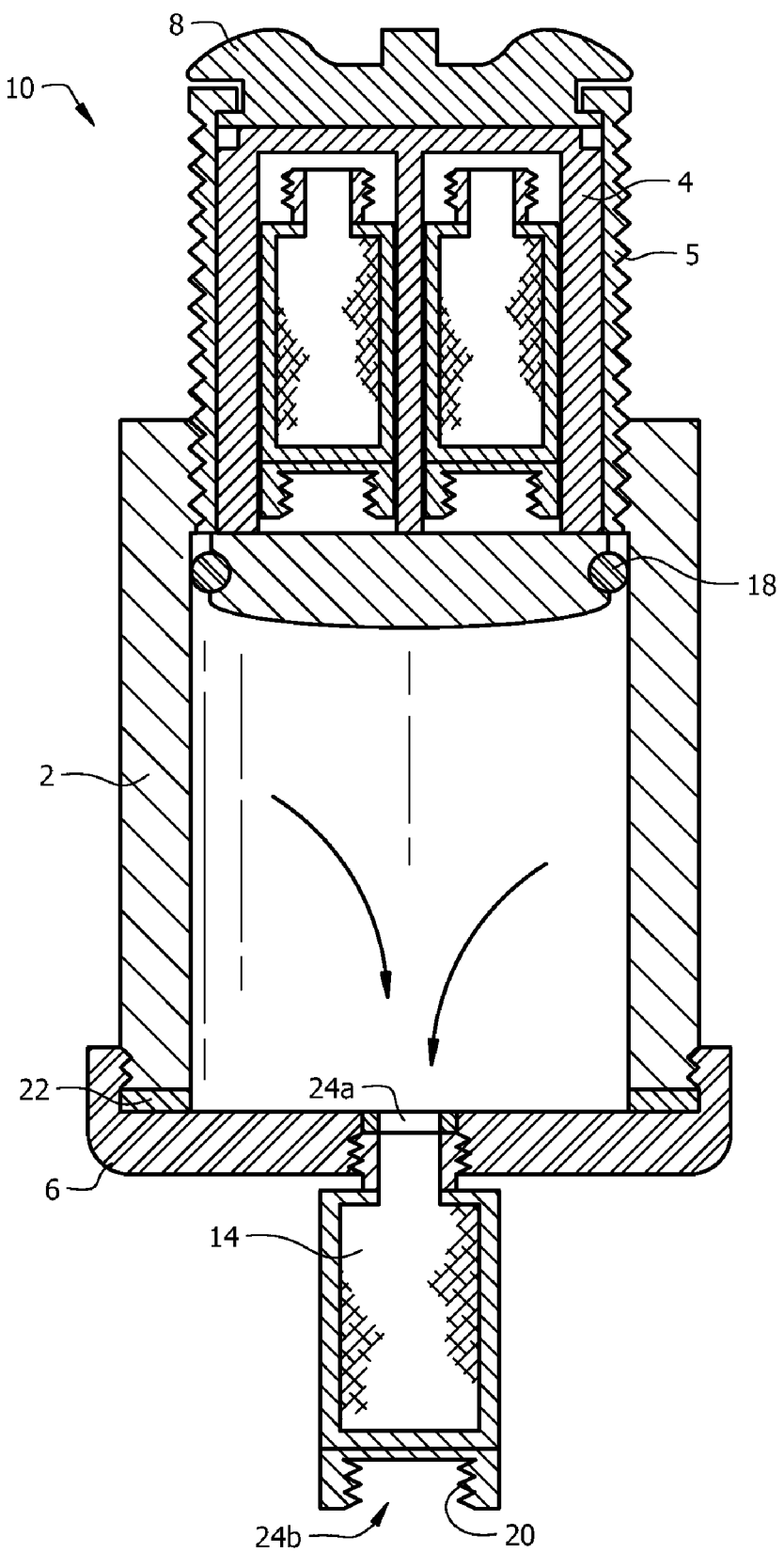
FIG. 1 depicts a side view of a portable water filtration assembly in a decompressed position.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

The current invention includes a portable water filter that uses a thread-forced piston 4 to generate sufficient PSI to force water through a filter medium (e.g., carbon, ceramic, HFM, micro-porous plastic, etc.) block or disk 14 (within a filter mass enclosure) to provide filtered water. A circular piston apparatus 4 is provided and sealingly disposed in inner relation to the interior of a circular receptacle or reservoir 2 adapted to hold a fluid. A series of threads or ribs 5 are disposed on the inner or outer wall of the piston apparatus 4 along its extent. It is contemplated that the threads 5 of the piston apparatus 4 may be disposed any distance along the extent of the piston 4. A series of threads or ribs are also disposed on the inner or outer wall of the reservoir 2 proximal to the top edge of the reservoir 2. It is also contemplated that the threads of the reservoir 2 may be disposed any distance along the extent of the reservoir 2. The threads of the reservoir 2 are adapted to engage the threads 5 of the piston 4. An O-ring or other gasket 18 is disposed near the bottom edge of the piston 4 to seal the interior of the reservoir 2 from the external environment and to prevent any fluid inside of the reservoir 2 from flowing or leaking between the inner edge of the reservoir 2 and outer edge of the piston 4.

In certain embodiments, the interior of the piston 4 may be substantially hollow with an open top and can be used to store a variety of supplementary items, for example additional filters 14 that can be used with the present invention. Sealing the supplementary items into the hollow piston is a covering 8 disposed in overlying relation to the open top. Any known coverings may be used, and any means of interconnecting the covering with the piston may be used. In a preferred embodiment, the covering utilizes a turn and lock method of coupling the covering 8 to the piston 4.

The interior of the reservoir 2 is substantially hollow and adapted to receive and enclose a fluid, such as unfiltered water. The reservoir 2 has an open top and substantially open bottom. The substantially open bottom includes a fluid port 24a through which the enclosed fluid can flow. A filter mass 14 made of carbon, ceramic, HFM, micro-porous plastic, other filtering substance, or any combination thereof is disposed within a frame enclosure and above or below the fluid port 24a, for example as a block, disk, or HFM. Carbon may a include pore size of about 0.5 µm, ceramic may include a pore size of about 0.01 µm, and HFM may include a pore size of about 0.01 µm. As the pore size decreases in the filter media, the amount of pressure required to be applied onto the water increases. As in the conventional art, water flows through the filter mass in a purification process, in which the filter mass captures or prevents flow of particulates larger than its pore size, and allows the fluid (i.e., water) without captured particulate to flow through the filter and be exposed to the filter mass, which is designed to absorb many contaminants, including toxic contaminants, that are not desirable in drinking water. As the water flows or is pushed through the filter mass, the clean water exits into a beverage container or storage reservoir placed beneath the reservoir 2 and water filter 14.

A user operates the water filtration device by filling the reservoir 2 with water to a desired level. Thereupon, the user twists or manipulates the covering 8 on the piston 4 to drive the piston 4 down the hollow interior of the reservoir 2. The covering 8 may include any structure that can facilitate the twisting, for example a lever, grip, supplementary tools, etc. As the piston 4 is driven down the interior of the reservoir 2, the threads 5 of piston 4 engage the threads of the reservoir 2 to direct the downward movement of the piston 4. The downward movement of the piston 4 creates pressure by forcing the leading edge of the piston 4 to contact the water within the reservoir 2 and forcing the water down the reservoir 2 and through the filter mass 14. The user continues to twist or manipulate the covering 8 to drive the piston 4 downward until all water has been forced through the filter mass 14. The user can twist the covering 8 at any desired rate, though it should not be a forced twist that applies excess pressure on the water. A slower rate may be preferred to maximize exposure of the water to the filter mass 14. A force between about 1 psi and about 200 psi or other suitable pressure, preferably at least 25 psi, may be applied to the water to obtain minimum flow rate. The need to maintain a range of flow rate to maximize the desired exposure time required for absorption can be addressed in part through the addition of an additional piston that is spring loaded.

Advantages of the water filtration device include its size and portability, low degree of maintenance, ease/cost of manufacture, ease/cost of assembly, accommodation for varying degrees of operator strength, and ease of use. Additionally, a sufficient flow of water can be obtained with sufficient facilitated pressure. Because of the quality of filtered water possible with the current invention, the water can be suitable for cooking, storing and sharing.

The device, other than the filter mass, can be formed of high quality plastics, for example including, but not limited to, poly(etherether ketone), polyethylene, polypropylene, polystyrene, polyvinyl chloride, polytetrafluoroethylene, and other thermoplastics and polymers. This is an improvement over the conventional art, which has used lower quality plastic that cannot withstand the pressure exerted within the current device and has also used metals that are toxic and damaging in transport. The current invention meets a long felt but unresolved need for a size-efficient, portable, durable water filtration device that can pressurize water through a filter mass that are unsuitable for use in the conventional art (i.e., because of the lack of pressure that is capable of being created in portable filtration devices of the conventional art).

If the pores of the filter mass 14 used are small enough, for example by using ceramic, HFM, or micro-porous plastic, then the device may qualify under NSF P231 Protocol, a certification which conventional portable water filtration devices cannot meet. Certain embodiment of the current invention that use these filter mass materials can fulfill the needs of travelers who have water that is presumed to be potable but that does not meet the standards of the traveler.

EXAMPLE 1

FIGS. 1-6 depict a hand-driven embodiment 10 of the current invention and the parts or aspects thereof. A substantially hollow piston apparatus 4 encloses or stores a plurality of water filters (e.g., carbon blocks) 14, as seen in FIGS. 1 and 5A, and includes an open top. Threads or ribs 5 are disposed along the extent of the outer wall of piston apparatus 4. Covering 8 is disposed in overlying relation to piston apparatus 4 to seal additional carbon blocks 14 from the external environment. Covering 8 is fabricated to allow twisting or manipulation of piston apparatus 4. Covering 8 may be hollow or indented (e.g., hex fitting) to fit any lever or tool used to facilitate twisting of covering 8. Other embodiments may include a spring (i.e., stored potential energy used to twist covering 8), motor (i.e., powered/electric twisting), hydro-reactive pellets (i.e., pellet contacts water and expands, thereby twisting covering 8), carbon dioxide cartridge (i.e., gas-powered twisting), or other suitable method of manipulation or twisting of covering 8.

An O-ring 18 is disposed along the bottom of piston apparatus 8 and may slightly overhang the boundary of the outer wall of piston apparatus 8. As piston apparatus 8 is placed within water reservoir 2 having an open top and open base, the overhanging aspect of the O-ring 18 makes contact with the inner wall of reservoir 2. Contact between the O-ring 18 and the inner wall of reservoir 2 seals the interior of reservoir 2 and prevents any fluid disposed therein from leaking out of reservoir 2 through any channel created between the inner wall of reservoir 2 and the outer wall of piston apparatus 4. Threads or ribs are disposed near the open top of reservoir 2 and are adapted to engage the threads 5 disposed on the outer wall of piston apparatus 4.

As covering 8 is twisted or manipulated, piston apparatus 4 is driven down the interior of reservoir 2, as the threads of reservoir 2 engage the threads 5 of piston apparatus 4 along the outer extent of apparatus 4. As piston apparatus 4 is driven downward, the O-ring 18 disposed about the bottom of piston apparatus 4 maintains the seal preventing any water from leaking out of reservoir 2. The leading edge of piston apparatus 4 contacts water enclosed within reservoir 2 and compresses the water forcing the water downward to the open base of reservoir 2.

Figure 2:
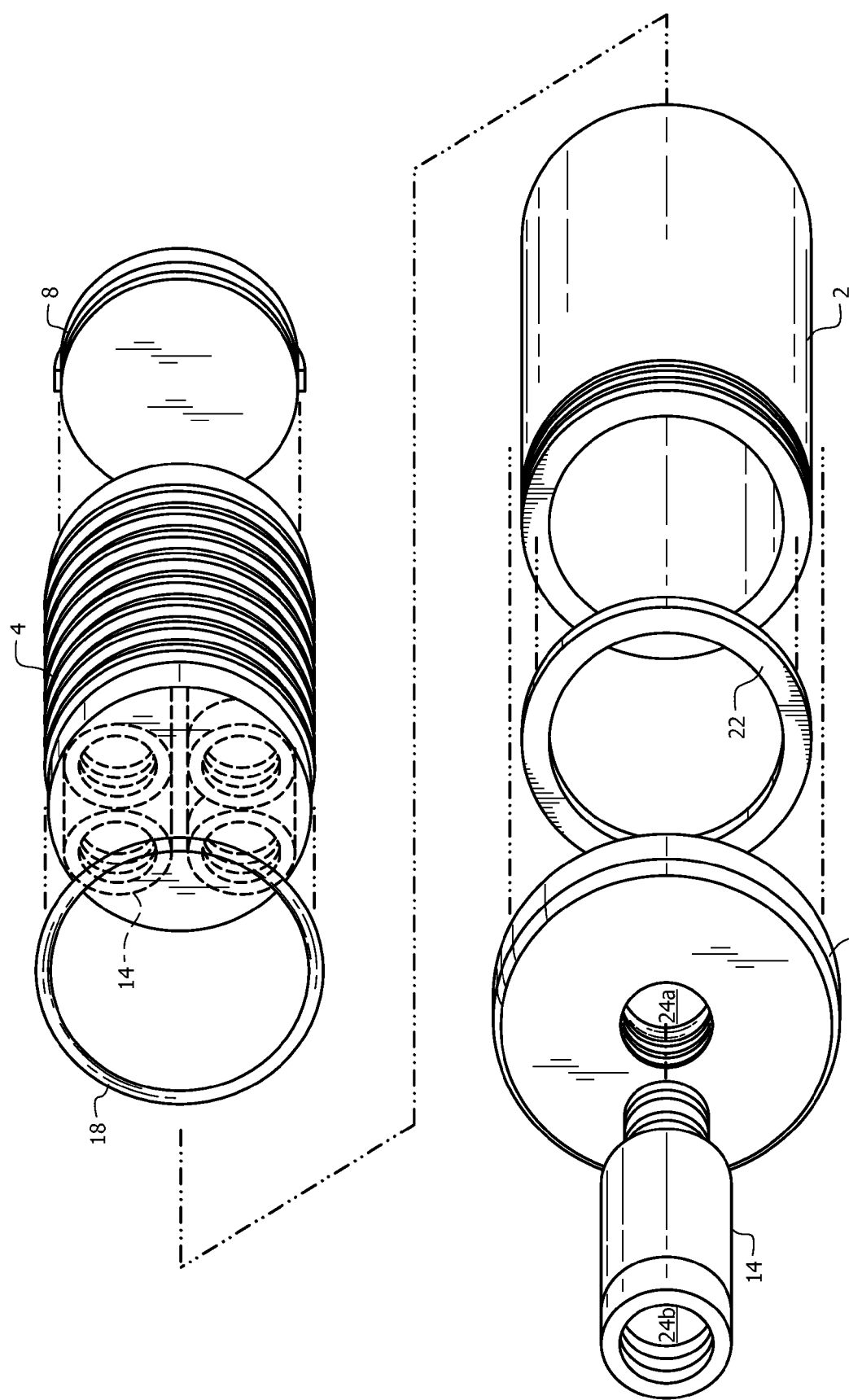
FIG. 2 depicts an exploded view of a portable water filtration assembly.

Filter frame 6 is disposed in underlying relation to the open base of reservoir 2 and can be maintained via tight threading or other means of enclosure. As seen in FIG. 1, a gasket 22 can be disposed beneath the bottom edge of reservoir 2 to seal reservoir 2 and filter frame 6. A first fluid port 24a is created by a break or opening in the middle of filter frame 6, as seen in FIGS. 1 and 2. Water filter 14 includes a carbon block having any suitably sized pores (e.g., 0.5 µm) and an optional threaded top that is adapted to engage with the fluid port 24a within filter frame 6. A standard washer (not shown) may be included above the top edge of the threaded top of water filter 14 to facilitate sealing, and an O-ring (not shown) may be included within the threaded top of water filter 14 to facilitate sealing with the bottom edge of the fluid port 24a. Filter frames, water filters, and/or filter media may be interchangeable. For example, carbon blocks may be suitable for use in the U.S., whereas ceramic blocks or HFM may be desired for use internationally. As the device 10 is upsized for use in large volume filtration in a portable environment, additional materials may be required to strengthen the device for a more industrial classification (e.g., stainless steel tank and metal fittings).

Figure 3:
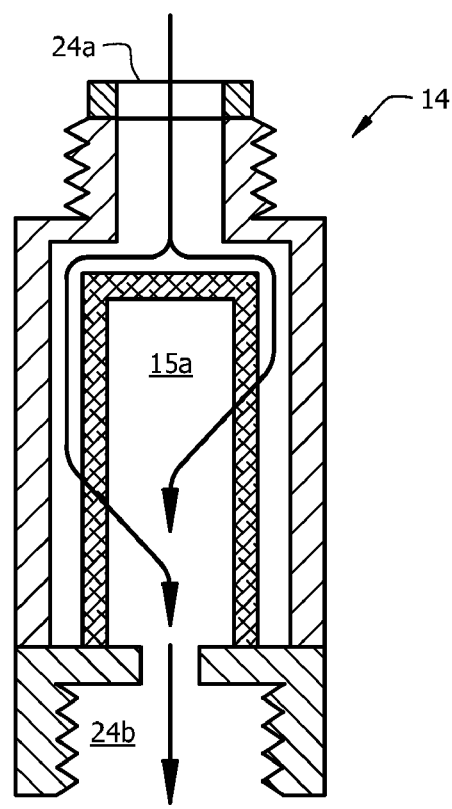
FIG. 3 depicts a side view of a filter cartridge designed for use in a portable water filtration assembly.

As seen in FIGS. 2 and 3, water filter 14 includes a base with an opening in the middle that may constitute as a second fluid port 24b. As the water flows through and within the water filter 14 and carbon block contained therein, filtered water exits through the second fluid port 24b. Water filter 14 may include a circular threaded extension 20 along its base that would engage a beverage container, such as a conventional water storage bottle or any readily available commercial water storage bottle, such as a NALGENE-brand bottle. The walls of the circular threaded extension 20 may also include a valve, port or aperture (not shown) that facilitates the release of pressure prior to the purified water entering the water bottle. Additionally the filtered water could be stored in a cistern or storage container, such a five-gallon jug.

Water filter 14 may be removed and include two caps (not shown) disposed on each side of water filter 14 to protect and store water filter 14.

Optionally, a piston jacket (now shown) may be disposed in overlying and outer relation to piston apparatus 4 for visual and protective purposes. A notch (not shown) may be disposed along the bottom portion or bottom edge of piston jacket. The notch would fit into a cavity (not shown) formed around reservoir 2 just above the lower threads of reservoir 2. When the notch of piston jacket engages the cavity of reservoir 2, piston jacket and filter frame 6 form a contiguous barrier around the substantial entirety of piston apparatus 4 and reservoir 2. When piston jacket is removed, it may be used also as a beverage container for the filtered water.

EXAMPLE 2

Figure 4A:
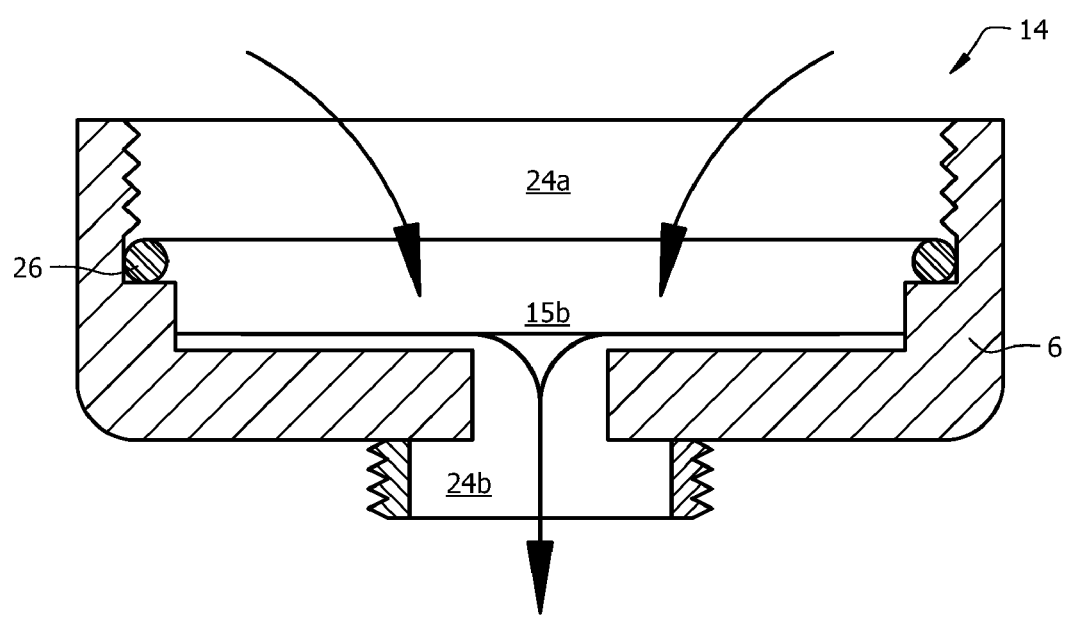
FIG. 4a depicts a side view of an alternate embodiment of a water filter cartridge for use in a portable water filtration assembly.
Figure 4B:
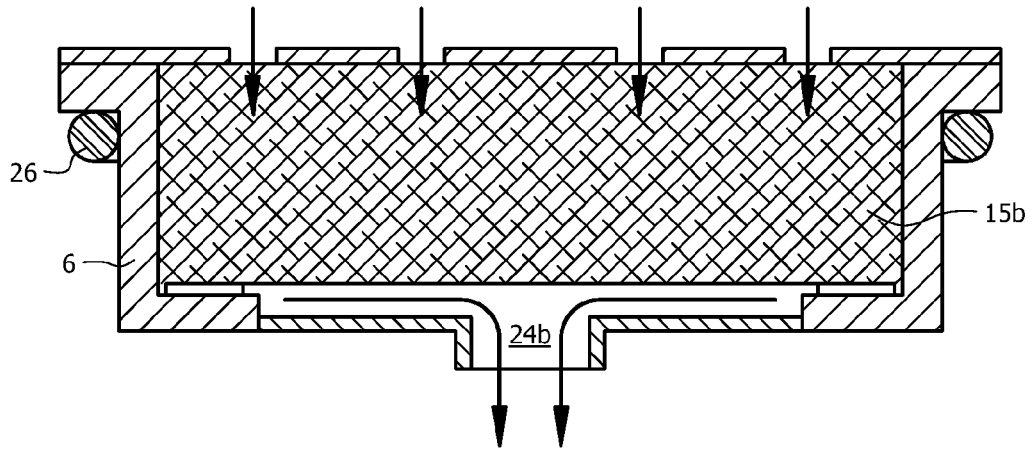
FIG. 4b depicts a close-up side view of the filter mass of the embodiment of FIG. 4a designed for use in a portable water filtration assembly.

FIGS. 4A and 4B depict an alternate embodiment of the water filter using in a portable water filter assembly. Filter frame 6 is adapted to receive and enclose filter disk 15b, as seen in FIGS. 4a and 4b, rather than receiving filter block 15a of the embodiment shown in FIG. 3. Filter frame 6 has a threaded extension along its top edge adapted to receive the lower threads of reservoir 2. Filter frame 6 is disposed in underlying relation to the open base of reservoir 2 and can be maintained via tight threading or other means of enclosure. An O-ring or gasket 26 can be disposed adjacent to (as seen in FIG. 4A) or beneath (as seen in FIG. 4B) to a lip of filter frame 6 to seal reservoir 2 and filter frame 6. Filter disk 15b may be glued or otherwise attached to filter frame 6, also seen in FIGS. 4A and 4B.

When filter frame 6 and reservoir 2 are interconnected, water contacts filter disk 15b through a plurality of apertures, indicated by the vertical arrows in FIG. 4B, along the top barrier of filter frame 6. Filter disk 15b may be formed of any suitable filtration material, for example carbon, ceramic, HFM, micro-porous plastic, or any combination thereof. Filter frame 6 includes a base with an opening in the middle that may constitute a fluid port 24b. As the water flows through and within the filter disk 15b, filter disk 15b leads into the fluid port 24b, and filtered water exits through the fluid port 24b. As shown by example in FIG. 4A, filter frame 6 may include a circular threaded extension along its base that would internally or externally engage a beverage container, such as a conventional water bottle.

Figure 5A:
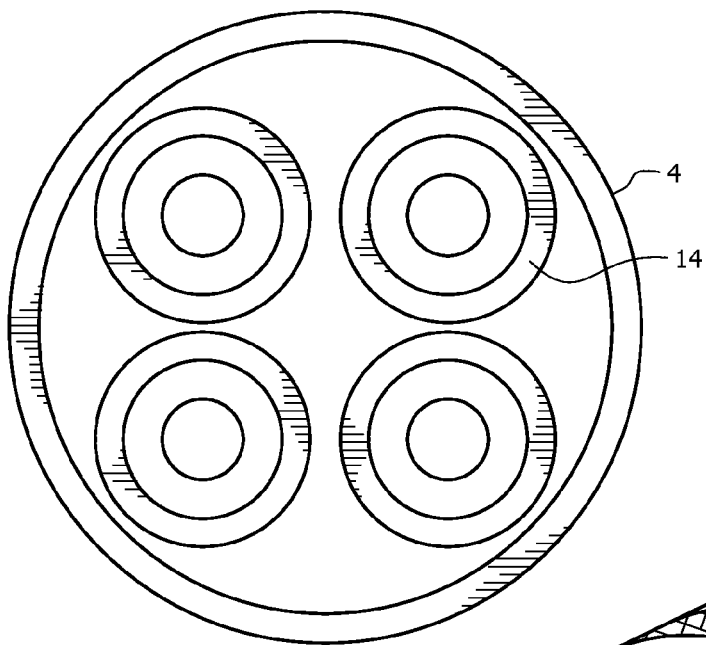
Figure 5B:
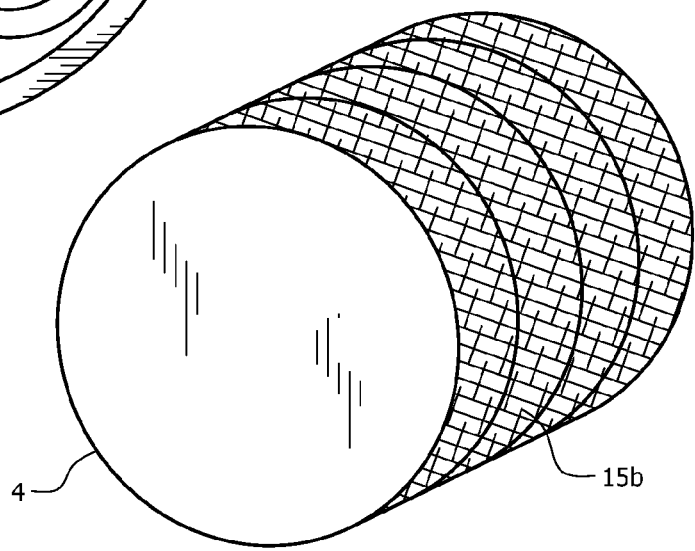
FIG. 5b depicts a perspective view of a storage capsule used in a portable water filtration assembly, said capsule containing a plurality of filter masses of FIG. 4b.

In this embodiment, piston apparatus 4 may be substantially hollow and adapted to receive and store additional filter disks 15b, as seen in FIG. 5B. Filter disks 16 can be stacked vertically for future use and later removed and placed within filter frame 6 for water filtration.

EXAMPLE 3

Figure 6:
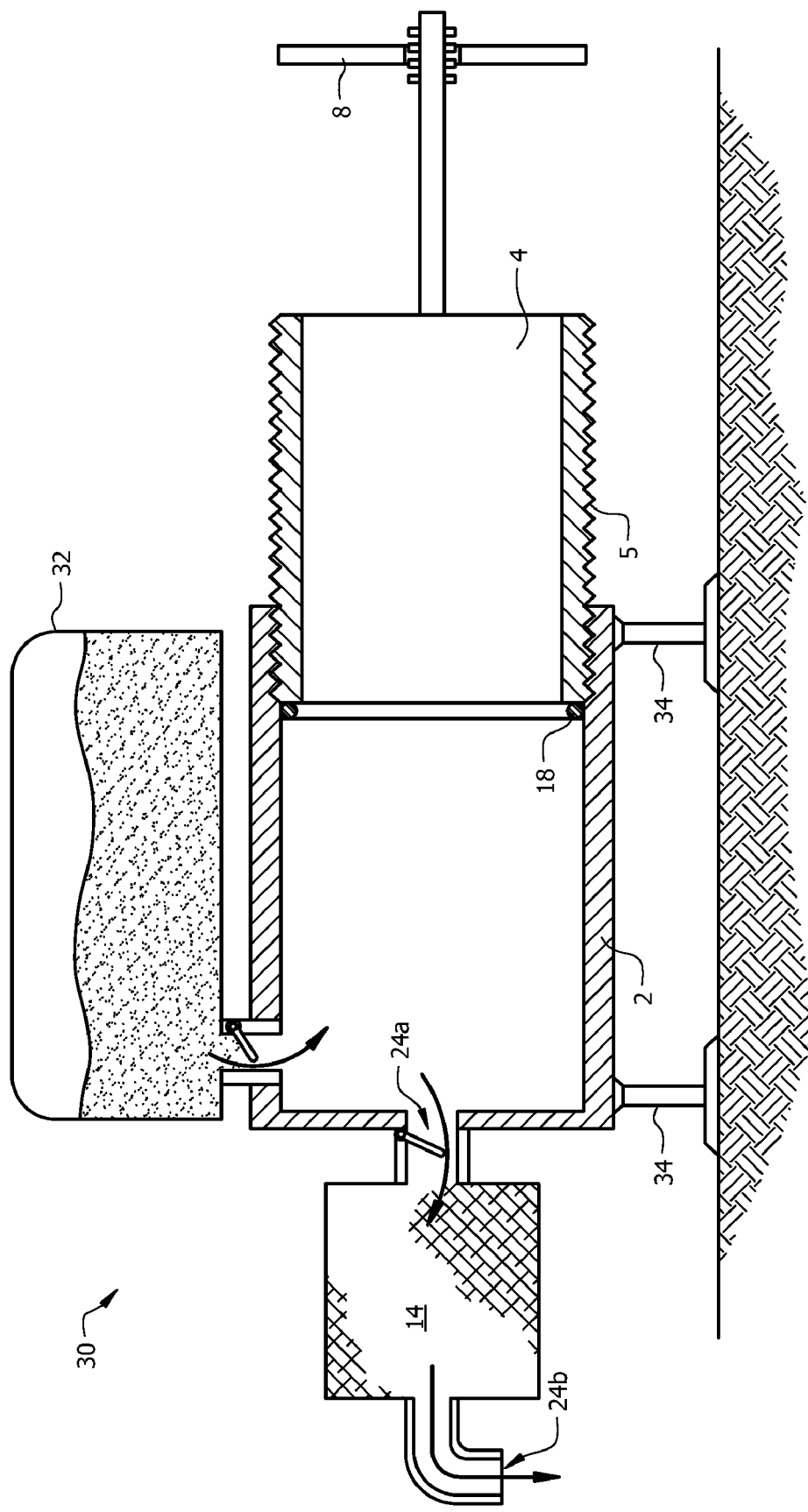
FIG. 6 depicts a side view of a portable water filtration assembly scaled up for use in filtration of large amounts of water.

FIG. 6 depicts an alternate embodiment 30 of the water filter apparatus. In this case, the apparatus 30 is horizontally-oriented and may be positioned on any flat surface, such as tabletop or ground. Piston 4 is driven into the hollow interior of water reservoir 2, forcing the water through fluid port 24a, through the pores of the water filter 14, and finally through fluid port 24b. Water reservoir 2 may be filled with unfiltered water through an aperture in the top of the apparatus via any water source 32. Embodiment 30 may be formed of a high quality plastic, metal, or other suitable material.

The apparatus 30 may further include legs for support. It is foreseeable that the legs could contain a clamping mechanism or locking mechanisms to provide additional support. A more permanent embodiment can use screws or nails placed through appropriate holes in the legs to secure the device to a surface.

For portability purposes the various pieces may be removable. For example, one embodiment could use easily detachable legs or filters. Another embodiment may use a removable piston, in which the piston can be fully removed from the hollow interior to assist in portability. Using this embodiment, larger amounts of water may be effectively filtered, removing substantially all contaminants.

With the addition of a supply reservoir and check valves to allow the device to continually "fill and the filter" without additional manipulation, this embodiment 30 could also be operated by an external motor to drive the threaded piston, thereby allowing for unmonitored and continued filtration.

EXAMPLE 4

Figure 7:
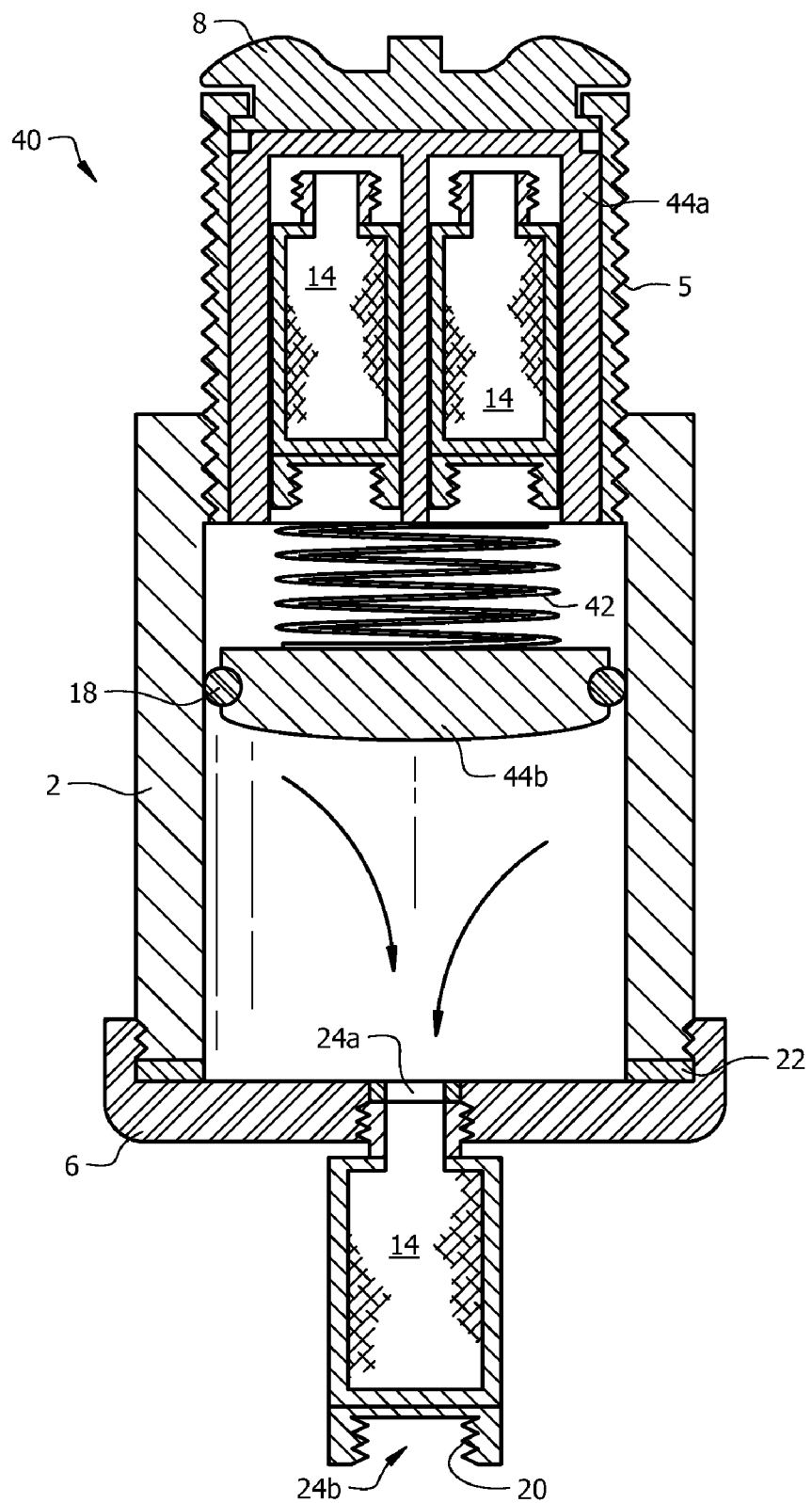
FIG. 7 depicts a side view of a spring-loaded twin piston embodiment of a portable water filtration assembly.

Referring to FIG. 7, an alternative embodiment 40 includes a first piston 44a and a second piston 44b, coupled to one another via a spring loaded mechanism 42 that will force the second piston 44b downward onto the unfiltered water within reservoir 2, thus having the ability to control exposure time. In this case, pressure is created by manually threading the first piston 44a. This threading causes tension to build in the spring between pistons 44a, 44b, as the spring 42 compresses against the threading force. The spring 42 then releases tension by pressing down on the second piston 44b, thus applying substantial pressure to the water within reservoir 2.

A person of ordinary skill may determine the tensile strength of the spring loaded mechanism 42 that would optimally control exposure time of the water to the filter mass 14. Short exposure time may not filter out sufficient contaminants, while excessively long exposure time may require a flow rate that is too slow for the operator. The addition of the spring loaded mechanism 42 allows for several advantages over the conventional art. First, the first piston 44a may be threaded to compress the spring 42, and allow the device 40 to remain stationary (i.e., not in use) while the spring 42 applies pressure to the second piston 44b. Essentially, the spring loaded mechanism 42 preloads the pressure that will eventually be applied to the unfiltered water in reservoir 2. Second, the spring loaded mechanism 42 allows for constant and consistent pressure to be applied to the second piston 44b, until such time that the tension in the spring 42 is removed. Use of the spring 42 allows for the device 40 to be relatively self-sufficient, in so far as to not need the operator's attention throughout the entire filtration process. More importantly, the spring 42 allows for additional regulation of "flow rate", an important factor in maintaining required exposure time for the carbon and additives to absorb the required amount of contaminant.

EXAMPLE 5

Figure 8:
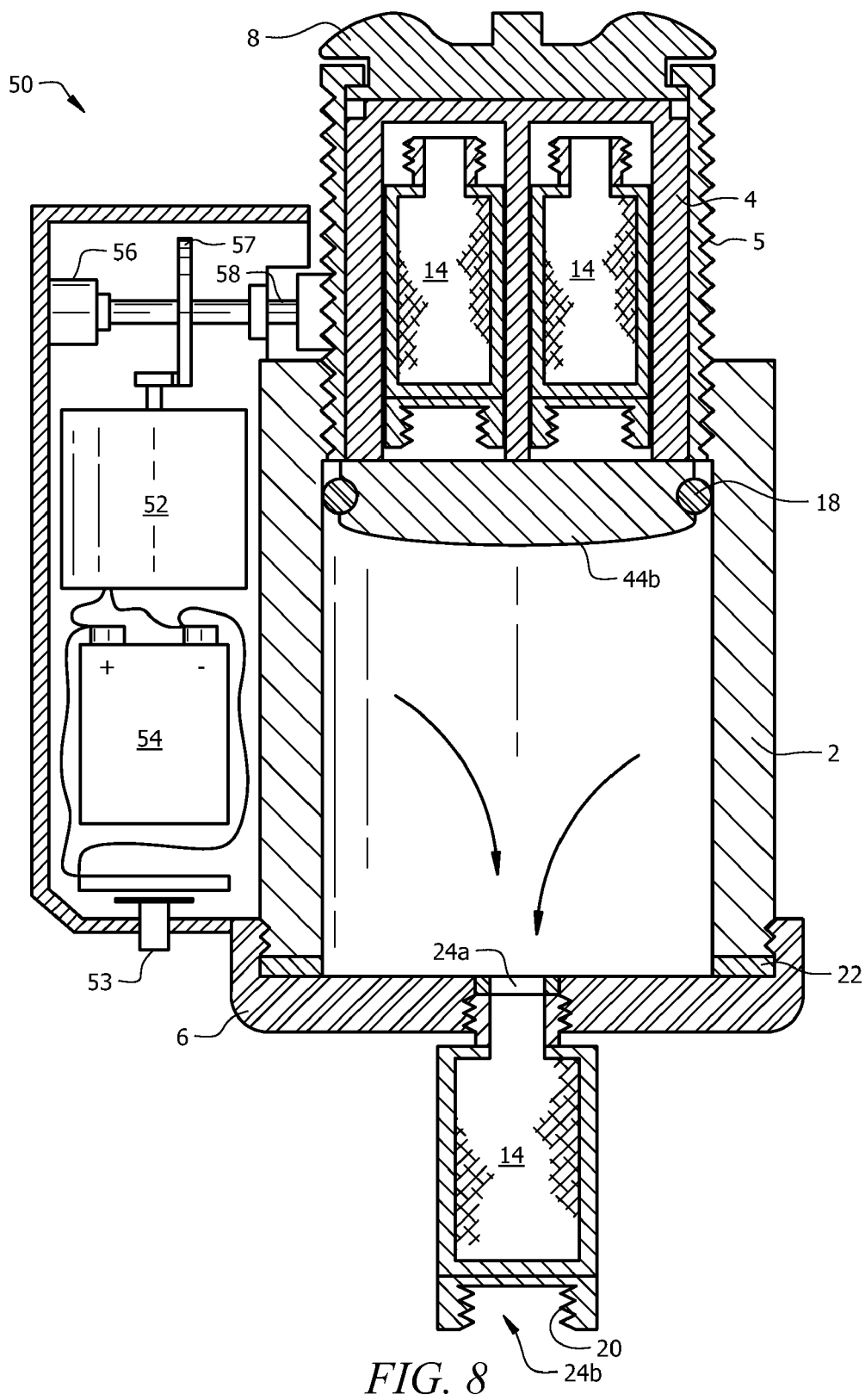
FIG. 8 depicts a side view of a battery powered direct drive motor as used in a portable water filtration assembly.

Referring to FIG. 8, another embodiment 50 uses battery power to drive the threading mechanism. This embodiment 50 can be done with or without the use of a spring 42, first piston 44a and second piston 44b to assist in application of pressure, as seen in Example 4 and FIG. 7. An on/off switch 53, or forward/stop/reverse switch or equivalent, located on the device 50 can be used to actuate the direct drive motor 54. Switch 53 in a "forward" position may drive the threaded piston 4 in a downward direction, thereby increasing pressure within the interior of reservoir. Switch 53 in an "off" position deactivates the threaded piston 4 allowing it to remain in a stationary position, not moving either downward or upward. Switch 53 in a "reverse" position may drive the threaded piston 53 in an upward direction, thereby releasing pressure from the interior of reservoir 2.

Switch 53, battery (or other DC power source) 54, and direct drive motor 52 are all in electric communication to power motor 52 to actuate threaded piston 4 in a downward and/or upward direction. Motor 52 is in mechanical communication with threaded piston 4, for example via standard mechanical apparatuses such as bushing/bearing 56, reduction gear 57, and ring and pinion 58. Alternative mechanical communication is envisioned, as long as there is analogous communication with threaded piston 4 to allow threaded piston 4 to thread in a downward direction (i.e., higher interior pressure) and/or an upward direction (i.e., lower interior pressure).

This embodiment 50 of the invention removes the need for user applied force. It is also effective in providing consistent and constant pressure to the piston 4. It is also envisioned that this embodiment 40 can be plugged into an AC power source to recharge the batteries or to apply power in absence of batteries.

EXAMPLE 6

Figure 9:
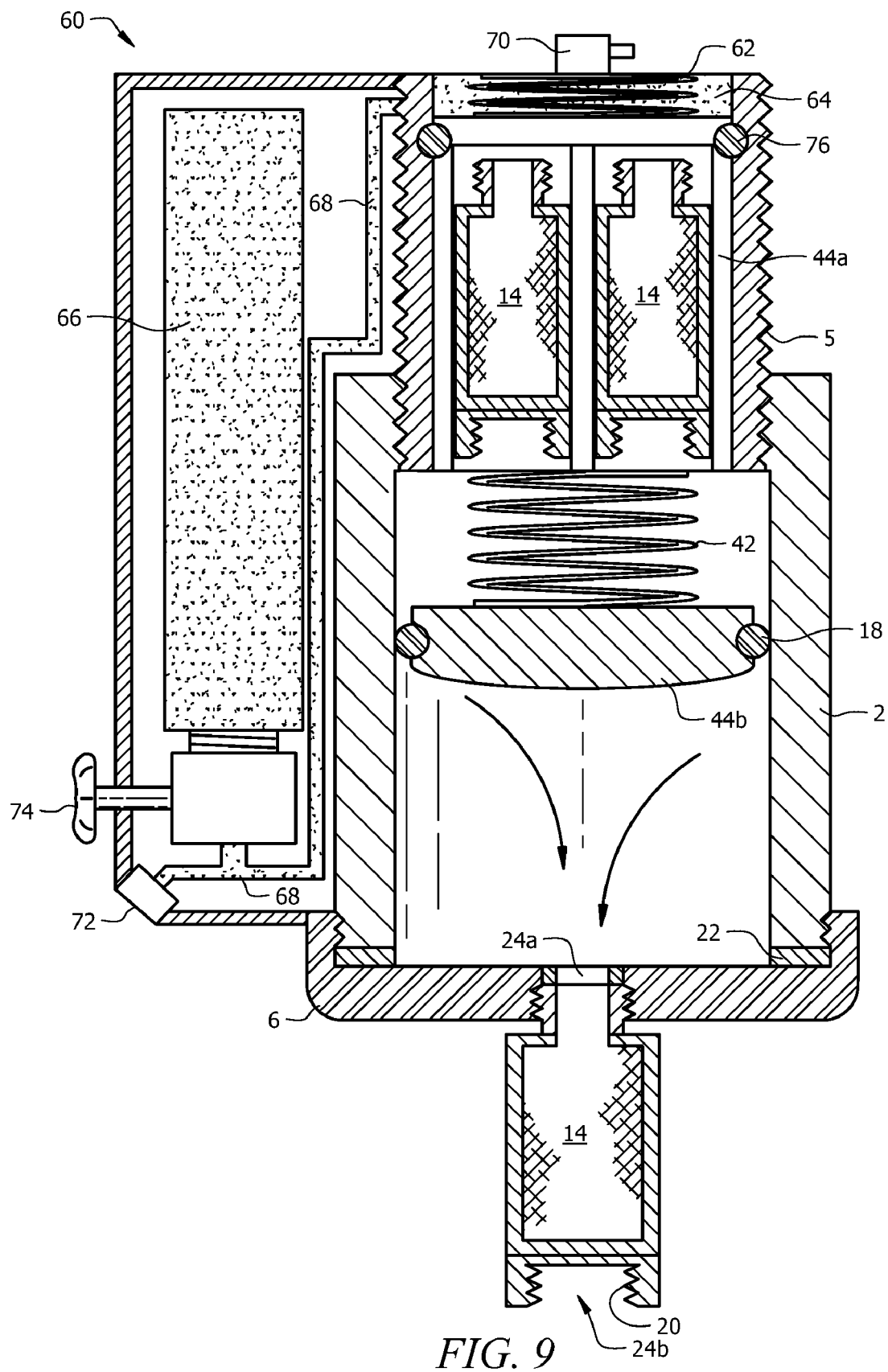
FIG. 9 depicts a side view of a compressed air-powered embodiment of a portable water filtration assembly.

Referring to FIG. 9, an embodiment 60 includes compressed gas used as an alternative to battery power. In this embodiment, a compressed gas cartridge 66 applies pressure to one or more springs, which in turn applies pressure to the piston 4, or applies pressure directly to the piston 4, or applies pressure to an impeller (not shown) that can be used to actuate one or more gears (not shown) for pressurizing the piston 4. The size, numbers and pressure of the gas cartridges 55 can change depending on desired results. For example, the amount, size and pressure of cartridges 66 used to compress the piston in Examples 1 and 2 will be different from those used in Example 3.

An advantage of the compressed gas is that it allows the operator to control the amount of pressure applied to the pistons 44a, 44b. This gives the operator more control over how much pressure is applied to the unfiltered water within the interior of reservoir 2. The amount of pressure generally controls how fast the water will flow through filter 14 and/or how much water is displaced through filter 14, thus allowing the operator more control over the amount of water received from filtration.

More specifically, in this embodiment, the device 60 includes one or more compressed gas cartridges 66, an actuating valve 74, and optional pressure gauge 72. The valve 74 provides for the release of compressed gas from cartridge 66 or for the seal of cartridge 66 to prevent exit of compressed gas. Using the valve, the operator can control pressure within the interior of reservoir 2. The pressure gauge 72 provides for the measurement of pressure of compressed air released from cartridge 66.

The compressed gas cartridge(s) 66, valve 74 and pressure gauge 72 are all in fluid communication and configured in any suitable manner, for example as seen in FIG. 9. Compressed air travels from cartridge 66 to overhead space 64 (within the cap structure) disposed in overlying relation to first piston 44a. Optionally, return spring 62 may be disposed within overhead space 64 to facilitate return of first piston 44a to a stationary or stable position, thus further controlling exposure time. The compressed air expands optional return spring 62 and forces first piston 44a in a downward direction. The downward movement of first piston 44a compresses spring mechanism 42, which, in turn, forces second piston 44b downward onto unfiltered water within the interior of reservoir 2, similar to that seen in Example 4. When all water has been forced through filter 14, optional return spring 62 can aid in the return of first and second pistons 44a, 44b to a stable position. Pressure release valve 70 is also included adjacent to overhead space 64 to release compressed air pressure as pistons 44a, 44b return to a stable or stationary state.

It is also envisioned that spring mechanism 42 is not included in this embodiment. Rather, first and second pistons are abuttingly coupled, as in Examples 1 and 2, and together pressurize the unfiltered water.

EXAMPLE 7

Figure 10:
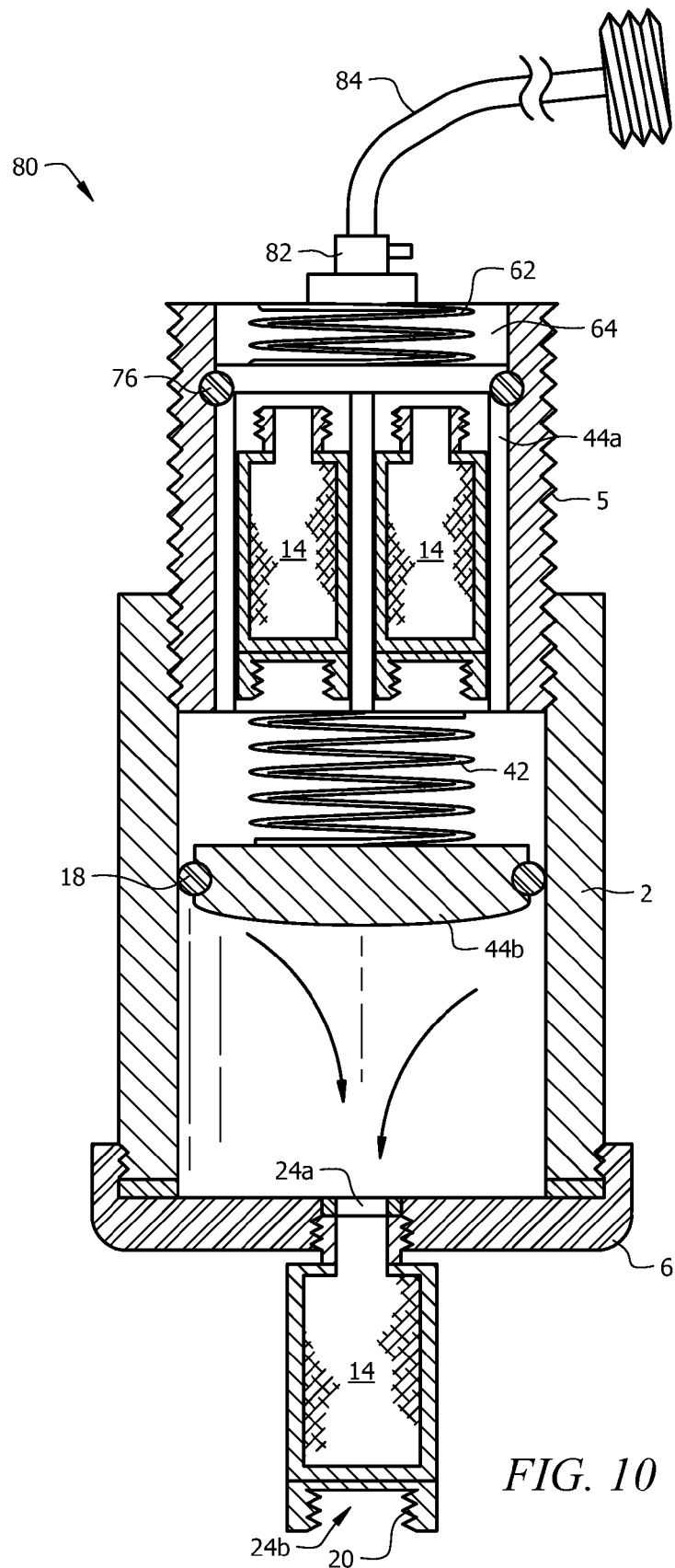
FIG. 10 depicts a side view of an external tap- or line-pressured embodiment of a portable water filtration assembly.

Referring to FIG. 10, rather than a self-contained power source as seen in Examples 5 and 6, another embodiment 80 of the current invention utilizes an outside pressure source 84 that is releasably coupled to water filtration device 80, in particular covering 8 or pressure relief valve 82. Outside pressure source 84 injects air or liquid into overhead space 64 (within the cap structure), which may include optional return spring 64 (as in Example 6). The injected fluid forces the piston in a downward direction. The piston may be similar to piston 4 seen in Examples 1 and 2, or similar to pistons 44a, 44b seen in Example 4. The point of coupling between outside pressure source and covering includes a pressure relief valve 84 that actuates and stops fluid from being injected into overhead space 64.

Definition of Claim Terms

Barrier: This term is used herein to refer to any boundary, structure or portion thereof that bars passage of a material, such as a fluid.

Beverage container: This term is used herein to refer to any structure in which a liquid can be stored or transported. For example, a "beverage container" can be a conventional water bottle into which filtered water would flow from the current invention. One can then store or transport the filtered water prior to consumption.

Cap structure: This term is used herein to refer to a protective or insulating cover disposed in overlying or surrounding relation to a structure or object, for example a piston. The interior of the "cap structure" can be in communication with a fluid, such that the flow of a fluid into the interior of the cap structure pressurizes the piston.

Carbon: This term is used herein to refer to an activated material used in filtration to remove contaminants or impurities via chemical adsorption. A "carbon" block can take any shape, but higher exposure to the carbon maximized filtration. Carbon may be combined with other filtration materials to optimize filtration. Typically this filtration is carried out inside-out.

Cartridge: This term is used herein to refer to an assembly that can be installed in or removed from a larger mechanism or replaced with another interchange assembly. The "cartridge" can contain a flowing material, such as compressed air, that can be released from the cartridge via a switch or valve.

Ceramic: This term is used herein to refer to a material used in filtration to remove contaminants or impurities (e.g., dirt, debris, bacteria). Liquid is exposed to the "ceramic" via pores within the ceramic disk or block. Ceramic may be combined with other filtration materials to optimize filtration. Typically this filtration is carried out outside-in.

Compressed air: This term is used herein to refer to air or gas maintained under a pressure that is generally greater than that of the atmosphere in order to reduce the volume taken up by the air or gas. When released, "compressed air" can be used to pressurize or actuate a pneumatic device.

Covering: This term is used herein to refer to any structure that closes or seals an opening from the external environment. A "covering" may be removable or permanent, and may facilitate twisting of the structure to which it is coupled.

Cylindrical: This term is used herein to refer to the shape of a cavity or chamber in a mechanism, such as the counterpart to a piston. Thus, a piston can be telescopically received within the "cylindrical" interior of the chamber.

Direct drive motor: This term is used herein to refer to a mechanism that utilizes a battery or other source of power to directly actuate the threading of the piston into the reservoir.

Downward: This term is used herein to refer to a direction of movement of a piston in the current invention when the piston is threaded within the reservoir. A "downward" movement of the piston presumably applies a higher amount of pressure to water contained within the reservoir.

Filter disk: This term is used herein to refer to a flat, circular structure made of any filtration material. Typically, a "filter disk" has a series of pores in it through which water can flow to remove unwanted contaminants or impurities.

Filter enclosure: This term is used herein to refer to a frame structure disposed in surrounding relation to a filter mass. The "filter enclosure" may include a fluid port that allows a fluid to flow from an external environment (e.g., reservoir) into contact with the filter mass.

Filter frame: This term is used herein to refer to a frame structure adapted to fit both the reservoir in the current invention and the filter enclosure. The "filter frame" provides a means of communication between the reservoir and the filter mass.

Filter mass: This term is used herein to refer to any structure or shape formed of a filtration material, for example carbon, ceramic, HFM, micro-porous plastic, or any combination thereof. The "filter mass" enables separation of suspended, dissolved, or particular matter from a fluid, in particular water. Combinations of substances include, for example, mixtures (e.g., multiple filtration materials, nutrients for taste, etc.) or multi-level (i.e., stacked) masses.

Fluid: This term is used herein to refer to any substance that can flow and/or take the relative shape of its container. A "fluid" can be a liquid or gas, most typically water in the current invention.

Fluid port: This term is used herein to refer to an opening where a connection can be made between two structures on either side of the opening. For example, as in the current invention, a "fluid port" may be included provide a pathway for water to flow from a water reservoir to a filter mass for filtration.

Force: This term is used herein to refer to driving a material or fluid through another material. For example, if water is "forced" through a filter mass, it is driven through the filter mass by some external pressure.

High quality plastic: This term is used herein to refer to a polymer material that is portable and relatively inexpensive, and resists deformation upon application of a force or pressure. Examples of "high quality plastics" include, but are not limited to, poly(etherether ketone), polyethylene, polypropylene, polystyrene, polyvinyl chloride, polytetrafluoroethylene, and other thermoplastics and polymers.

Hollow: This term is used herein to refer to the characteristic of a solid structure having an empty space or cavity within its interior.

Hollow fiber membrane: This term is used herein to refer to a material used in filtration to remove contaminants or impurities (e.g., dirt, debris, bacteria). "Hollow fiber membrane" is formed of a plurality of thin tubes or fibers through which water flows and the particulate permeates and is collected in the cartridge filter enclosure area surrounding the fibers. This filtration can be carried out either inside-out or outside-in.

Impermeable: This term is used herein to refer to the characteristic of a structure to prevent the passage of a fluid. Thus, if the walls of a cylinder are "impermeable", the walls should prevent the passage of a fluid, such as liquid or gas.

Inner extent: This term is used herein to refer to the interior aspect of a structure along the longitudinal axis of that structure. Thus, the "inner extent" of a cylinder (e.g., water reservoir) can be the inside surface of the wall of the cylinder.

Interstitial space: This term is used herein to refer to a cavity or volume between two structures or objects, especially between objects that are adjacent to each other. Thus, an "interstitial space" exists between a piston and a cap structure disposed in surrounding relation to the piston.

Jacket: This term is used herein to refer to a removable or replaceable protective or insulating cover disposed in surrounding relation to a structure or object.

Line pressure source: This term is used herein to refer to any structure or point of origin of a fluid that is expelled to increase the pressure within a finite space. The "line pressure source" is in sealable flow communication with the finite space such that the fluid can easily flow into the space.

Manipulation: This term is used herein to refer to influencing, managing, directing, twisting, or otherwise physically controlling a structure. Thus, for example, "manipulation" of a piston refers to twisting of the piston to thread it with the water reservoir in a downward or upward direction.

Micro-porous plastic: This term is used herein to refer to a polymer material containing pores with diameters of about 0.01 μm or less. "Micro-porous plastic" can be used in filtration to remove contaminants or impurities (e.g., dirt, debris, bacteria). Liquid is exposed to the plastic via pores within the filter disk or block. Micro-porous plastic may be combined with other filtration materials to optimize filtration.

Open: This term is used herein to refer to the characteristic of a side of a structure being accessible, unimpeded or not closed. Thus, a cylinder with an "open" top has an interior that is accessible through the top.

Outer extent: This term is used herein to refer to the exterior aspect of a structure along the longitudinal axis of that structure. Thus, the "outer extent" of a cylinder (e.g., piston) can be the outside surface of the wall of the cylinder.

Partially: This term is used herein to refer to a piston disposed to some extent within the interior of a water reservoir.

Piston: This term is used herein to refer to a cylinder or valve that fits inside a hollow cylindrical vessel and moves within the vessel under pressure. For example, when pressure is applied to a piston threaded within a water reservoir, this "piston" can be threaded further into the interior of the reservoir.

Power source: This term is used herein to refer to any structure or point of origin of electrical energy. For example, a "power source" can be a battery or an electrical outlet.

Pressure release valve: This term is used herein to refer to a valve used to control or limit the pressure in a system, vessel, or space therein. Pressure is released from the system, vessel, or space via a passage out of the system through the "pressure release valve".

Pressure relief valve: This term is used herein to refer to a valve used to control or limit the pressure in a system, vessel, or space therein. Fluid is allowed to enter into the system, vessel, or space from a line pressure source through the "pressure relief valve".

Pressurize: This term is used herein to refer to placing a fluid under increased pressure within a reservoir or vessel. As used in the current invention, water is "pressurized" by a piston that reduces the amount of volume available for the water to occupy within the interior of the water reservoir.

Return spring: This term is used herein to refer to a mechanical structure with an inherent bias and is disposed within the interstitial space between the piston and cap structure to facilitate the movement of the piston to its stable, non-pressurized state after filtration.

Sealable flow communication: This term is used herein to refer to a passageway between two structures that has capabilities of being open (i.e., fluid) or closed (i.e., sealed). When open, a fluid can flow between the two structures, and when closed, the fluid cannot flow between the two structures.

Sealing contact: This term is used herein to refer to the physical touching between two structures, said contact prohibiting the flow of a fluid between the two structures. Thus, when a piston has "sealing contact" with the walls of a vessel, a fluid cannot flow between the piston and vessel.

Supplementary items: This term is used herein to refer to additional structures or objects that completes or makes an addition to the device of the current invention. An example of "supplementary items" is additional water filters that can replace the installed water filter.

Threads: This term is used herein to refer to ridges or lugs used to provide an effective seal and to facilitate the downward movement of a piston within a vessel to pressurize the interior of the vessel. When a user engages the "threads" of the piston and the "threads" of the reservoir, the piston can move further into or out of the reservoir and increase or decrease pressure, respectively, within the reservoir.

Tubing: This term is used herein to refer to a long, thin hollow structure that allows a fluid to flow therewithin. Each end of the "tubing" can be in fluid communication with a structure or material that provides or receives the fluid.

Water filter: This term is used herein to refer to a structure that facilitates the separation of suspended, dissolved, or particular matter from a fluid, in particular water. The "water filter" can include a filter mass, filter enclosure, filter frame or other structure that positions the water filter to receive the fluid.

Water reservoir: This term is used herein to refer to a vessel in which water can be received. The "water reservoir" can also threadably receive a piston within its hollow interior.

It will thus be seen that the objects set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A water filter assembly, comprising:
   a substantially hollow cylindrical water reservoir having a substantially impermeable wall, an open top, and an open bottom;
   a cylindrical piston at least partially disposed within said water reservoir at said open top, a bottom portion of said piston having sealing contact with said wall of said water reservoir;
   a first plurality of threads disposed at least partially along the inner extent of said water reservoir;
   a second plurality of threads disposed at least partially along the outer extent of said piston and threadably engaging said first plurality of threads; and
   a water filter adjacent to and fluidly coupled to a bottom edge of said open bottom of said water reservoir,
   said pressure on said water increased or decreased by engaging said first plurality of threads and said second plurality of threads, said increased water pressure pushing said water downwardly through said water filter.

2. A water filter assembly as in claim 1, further comprising:
   said water filter including a circular filter frame disposed in underlying relation to said bottom edge of said water reservoir; and
   a fluid port disposed in the center of said filter frame, said water adapted to flow through said fluid port.

3. A water filter assembly as in claim 2, further comprising:
   said water filter further including a filter mass disposed in underlying relation to said filter frame, said filter mass coupled to said fluid port of said filter frame via a filter enclosure; and
   said filter enclosure having an additional fluid port disposed on its bottom portion,
   said water flowing through said fluid port into said filter mass and flowing through said filter mass to exit said water filter through said additional fluid port into a beverage container.

4. A water filter assembly as in claim 3, further comprising:
said additional fluid port structurally adapted to stably couple said beverage container.

5. A water filter assembly as in claim 3, further comprising:
said filter mass formed of a material selected from the group consisting of carbon, ceramic, hollow fiber membrane, micro-porous plastic, and any combination of carbon, ceramic, hollow fiber membrane, and micro-porous plastic.

6. A water filter assembly as in claim 2, further comprising:
said water filter further including a filter disk disposed within said filter frame in overlying relation to said fluid port,
said water flowing through said filter disk and exiting said water filter through said fluid port into a beverage container.

7. A water filter assembly as in claim 6, further comprising:
said fluid port structurally adapted to stably couple said beverage container.

8. A water filter assembly as in claim 6, further comprising:
said filter disk formed of a material selected from the group consisting of carbon, ceramic, and a combination of carbon and ceramic.

9. A water filter assembly as in claim 1, further comprising:
said piston being substantially hollow and adapted to store supplementary items.

10. A water filter assembly as in claim 1, further comprising:
a covering disposed in overlying relation to said piston and structurally adapted to facilitate manipulation of said piston.

11. A water filter assembly as in claim 1, further comprising:
a piston jacket disposed in overlying and outer relation to said piston to enclose said piston and said water reservoir.

12. A water filter assembly as in claim 1, further comprising:
said cylindrical water reservoir, said cylindrical piston, said first plurality of threads, and said second plurality of threads being formed of a high quality plastic.

13. A water filter assembly as in claim 1, further comprising:
a direct drive motor mechanically coupled to said water filter assembly, said mechanical coupling enabling said engagement between said first plurality of threads and said second plurality of threads; and
a power source electrically coupled to said direct drive motor.

14. A water filter assembly as in claim 1, further comprising:
a cap structure disposed in outer and overlying relation to said piston, said cap structure including an interstitial space above said piston, a top edge of said piston forming a barrier between said interstitial space of said cap structure and an interior of said piston;
a return spring disposed in said interstitial space of said cap structure;
a cartridge containing compressed air;
a hollow tubing coupling said cartridge to said interstitial space of said cap structure, said compressed air being released from said cartridge and entering said interstitial space to force said engagement between said first plurality of threads and said second plurality of threads; and
a pressure release valve disposed in sealable flow communication with said interstitial space of said cap structure.

15. A water filter assembly as in claim 1, further comprising:
a cap structure disposed in outer and overlying relation to said piston, said cap structure including an interstitial space above said piston, a top edge of said piston forming a barrier between said interstitial space of said cap structure and an interior of said piston;
a return spring disposed in said interstitial space of said cap structure; and
a pressure relief valve disposed in sealable flow communication with said interstitial space, said pressure relief valve adapted to receive a line pressure source, said line pressure source suitable for the flow of a fluid,
said line pressure source engaging said pressure relief valve, said fluid flowing into said interstitial space of said cap structure, forcing said engagement between said first plurality of threads and said second plurality of threads.

16. A water filter assembly, comprising:
a substantially hollow cylindrical water reservoir having a substantially impermeable wall, an open top, and an open bottom;
a first cylindrical piston at least partially disposed within said water reservoir;
a first plurality of threads disposed at least partially along the inner extent of said water reservoir;
a second plurality of threads disposed at least partially along the outer extent of said first piston;
said first plurality of threads adapted to engage said second plurality of threads;
a second cylindrical piston wholly disposed within said water reservoir and in underlying relation to said first piston, said second piston having sealing contact with said wall of said water reservoir;
a spring mechanism coupling said first piston and said second piston;
a water filter coupled in underlying relation to a bottom edge of said open bottom of said water reservoir,
said first plurality of threads engaging said second plurality of threads to compress said spring mechanism, said compression creating a resilient bias that forces said second piston to pressurize water disposed within said water reservoir and to force said water downward through said water filter.

17. A water filter assembly as in claim 16, further comprising:
said water filter including a circular filter frame disposed in underlying relation to said bottom edge of said water reservoir; and
a fluid port disposed in the center of said filter frame, said water adapted to flow through said fluid port.

18. A water filter assembly as in claim 17, further comprising:
said water filter further including a filter mass disposed in underlying relation to said filter frame, said filter mass coupled to said fluid port of said filter frame via a filter enclosure; and
said filter enclosure having an additional fluid port disposed on its bottom portion,
said water adapted to flow through said fluid port into said filter mass and through said filter mass to exit said water filter through said additional fluid port into a beverage container.

19. A water filter assembly as in claim 18, further comprising:
said additional fluid port structurally adapted to stably couple said beverage container.

20. A water filter assembly as in claim 18, further comprising:
said filter mass formed of a material selected from the group consisting of carbon, ceramic, hollow fiber membrane, and any combination of carbon, ceramic, and hollow fiber membrane.

21. A water filter assembly as in claim 17, further comprising:
said water filter further including a filter disk disposed within said filter frame in overlying relation to said fluid port,
said water flowing through said filter disk and exiting said water filter through said fluid port into a beverage container.

22. A water filter assembly as in claim 21, further comprising:
said fluid port structurally adapted to stably couple said beverage container.

23. A water filter assembly as in claim 21, further comprising:
said filter disk formed of a material selected from the group consisting of carbon, ceramic, and a combination of carbon and ceramic.

24. A water filter assembly as in claim 16, further comprising:
said piston being substantially hollow and adapted to store supplementary items.

25. A water filter assembly as in claim 16, further comprising:
a covering disposed in overlying relation to said piston and structurally adapted to facilitate manipulation of said piston.

26. A water filter assembly as in claim 16, further comprising:
a piston jacket disposed in overlying and outer relation to said piston to enclose said piston and said water reservoir.

27. A water filter assembly as in claim 16, further comprising:
said cylindrical water reservoir, said cylindrical piston, said first plurality of threads, and said second plurality of threads being formed of a high quality plastic.

28. A water filter assembly as in claim 16, further comprising:
a direct drive motor mechanically coupled to said water filter assembly, said mechanical coupling enabling said engagement between said first plurality of threads and said second plurality of threads; and
a power source electrically coupled to said direct drive motor.

29. A water filter assembly as in claim 16, further comprising:
a cap structure disposed in outer and overlying relation to said first piston, said cap structure including an interstitial space above said first piston, a top edge of said first piston forming a barrier between said interstitial space of said cap structure and an interior of said first piston;
a return spring disposed in said interstitial space of said cap structure;
a cartridge containing compressed air;
a hollow tubing coupling said cartridge to said interstitial space of said cap structure, said compressed air being released from said cartridge and entering said interstitial space to
force said engagement between said first plurality of threads and said second plurality of threads; and
a pressure release valve disposed in sealable flow communication with said interstitial space of said cap structure.

30. A water filter assembly as in claim 16, further comprising:
a cap structure disposed in outer and overlying relation to said first piston, said cap structure including an interstitial space above said first piston, a top edge of said first piston forming a barrier between said interstitial space of said cap structure and an interior of said first piston;
a return spring disposed in said interstitial space of said cap structure; and
a pressure relief valve adapted to receive a line pressure source, said line pressure source suitable for the flow of a fluid, said line pressure source engaging said pressure relief valve, said fluid flowing into said interstitial space of said cap structure, forcing said engagement between said first plurality of threads and said second plurality of threads.

* * * * *

UNITED STATES PATENT AND TRADEMARK OFFICE
CERTIFICATE OF CORRECTION

| | |
|---|---|
| PATENT NO. | : 8,323,490 B1 |
| APPLICATION NO. | : 13/565322 |
| DATED | : December 4, 2012 |
| INVENTOR(S) | : William Scott Wright and Bradley J. Florin |

Page 1 of 1

It is certified that error appears in the above-identified patent and that said Letters Patent is hereby corrected as shown below:

Title Page, item (75) should read;

(75) Inventors: William Scott Wright, Fort Collins, CO (US); Bradley J. Florin, Fort Collins, CO (US)

Signed and Sealed this
Twelfth Day of February, 2013

Teresa Stanek Rea
*Acting Director of the United States Patent and Trademark Office*